(12) United States Patent
Sato (10) Patent No.: US 8,811,270 B2
(45) Date of Patent: Aug. 19, 2014

(54) EFFICIENT ALLOCATION OF SHARED BANDWIDTH

(75) Inventor: Takashi Sato, Cupertino, CA (US)

(73) Assignee: NXP, B.V., Eindhoven (NL)

( * ) Notice: Subject to any disclaimer, the term of this patent is extended or adjusted under 35 U.S.C. 154(b) by 1238 days.

(21) Appl. No.: 11/721,158

(22) PCT Filed: Dec. 9, 2005

(86) PCT No.: PCT/IB2005/054168
§ 371 (c)(1),
(2), (4) Date: Aug. 7, 2009

(87) PCT Pub. No.: WO2006/061807
PCT Pub. Date: Jun. 15, 2006

(65) Prior Publication Data
US 2009/0296732 A1   Dec. 3, 2009

(51) Int. Cl.
*H04B 7/212* (2006.01)

(52) U.S. Cl.
USPC .......................................... 370/322; 370/348

(58) Field of Classification Search
USPC ......... 370/321, 337, 347, 349, 389, 376, 431, 370/442, 445, 443, 447, 458, 322, 348
See application file for complete search history.

(56) References Cited

U.S. PATENT DOCUMENTS 5,648,958 A * 7/1997 Counterman ................. 370/458

FOREIGN PATENT DOCUMENTS

| EP | 1211823 A1 | 6/2002 |
| EP | 1478135 A1 | 11/2004 |
| WO | 2003079579 A1 | 9/2003 |

OTHER PUBLICATIONS

Xin, Liu: et al "Scheduling Algorithms Analysis for MPEG-4 Traffic in UWB" 2004 IEEE 60th Vehicular Technology Conference vol. 7, Sep. 26, 2004, pp. 5310-5314.
Rangnekar, A; et al "Multiple Channel Scheduling in UWB Based IEEE 802.15.3 Networks" Broadband Networks, 2004. First International Conference in San Jose. Oct. 25, 2004, pp. 406-415.
Rhee, Seung Hyong; et al "An Application-Aware MAC Scheme for IEEE 802.15.3 High-Rate WPAN" Wireless Communications and Netowrking Conference, 2004. WCNC. vol. 2, Mar. 2004, pp. 1018-1023.

(Continued)

*Primary Examiner* — Brenda H Pham (57) ABSTRACT

The present invention, generally speaking, provides for sharing of bandwidth of a shared medium between multiple devices. In one embodiment, the shared medium is structured in accordance with a frame or superframe structure, each frame or superframe having medium access slots of specified time duration defined therein, groups of N contiguous medium access slots defining different allocations zones, groups of M medium access slots defining coordinated sets of medium access slots, wherein the medium access slots of a coordinated set belonging to different allocation zones are equally spaced in time. A device identifies a reservation as regular or irregular, wherein a regular reservation causes the entire medium access slots in one or more coordinated sets to be allocated. In the case of either a regular or an irregular reservation, allocating medium access slots such that a number of unallocated contiguous medium access slots within each allocation zone is maximized. The contiguous unallocated medium access slots separate the group of regular allocations and the group of irregular allocations within each allocation zone.

4 Claims, 8 Drawing Sheets

(56) References Cited

OTHER PUBLICATIONS

Tseng, Yi-Hsien; et al "Efficient Resource Allocation for IEEE 802.15.3(a) Ad Hoc Networks" Intelligence in Communication Systems. IFIP International Conference, Intellcomm 2004. Proceedings (Lecture Notes in Computer Science vol. 3283) Springer-Verlag. Nov. 26, 2004, pp. 128-142.

PCT/IB2005/054168; International Preliminary Report on Patentability and Written Opinion; Jun. 21, 2007.

* cited by examiner

Figure 2. – MAS and time within a superframe

Figure 3 – Allocation zones in a superframe

Figure 4 – Coordinated MAS sets in a superframe

Fig 5

Fig 6
With Rule 1    Without Rule 1

EFFICIENT ALLOCATION OF SHARED BANDWIDTH

The present invention relates to bandwidth sharing by communication devices.

In communication networks, devices are often required to share bandwidth of a shared medium, wired or wireless. One example of such a network is a wireless PAN (personal area network). Such networks are ad hoc, meaning that devices may join the network or leave the network frequently without advance warning. A mechanism is then required to coordinate sharing of the medium—in this instance wireless spectrum. The same problem occurs to various degrees in various different types of networks.

A particular challenge arises in balancing device access against efficient use of medium. In one proposed solution, a device is free to reserve resource with relatively few restrictions. Efficiency of medium use therefore suffers.

The present invention, generally speaking, provides for sharing of bandwidth of a shared medium between multiple devices. In one embodiment, the shared medium is structured in accordance with a frame or superframe structure, each frame or superframe having medium access slots of specified time duration defined therein, groups of N contiguous medium access slots defining different allocations zones, groups of M medium access slots defining coordinated sets of medium access slots, wherein the medium access slots of a coordinated set belonging to different allocation zones are equally spaced in time. A device identifies a reservation as regular or irregular, wherein a regular reservation causes the entire medium access slots in one or more coordinated sets to be allocated. In the case of a regular or an irregular reservation, allocating medium access slots such that a number of unallocated contiguous coordinated sets of medium access slots within each allocation zone is maximized.

The present invention may be more fully understood from the following description in conjunction with the appended drawing. In the drawing.

Figure 1:
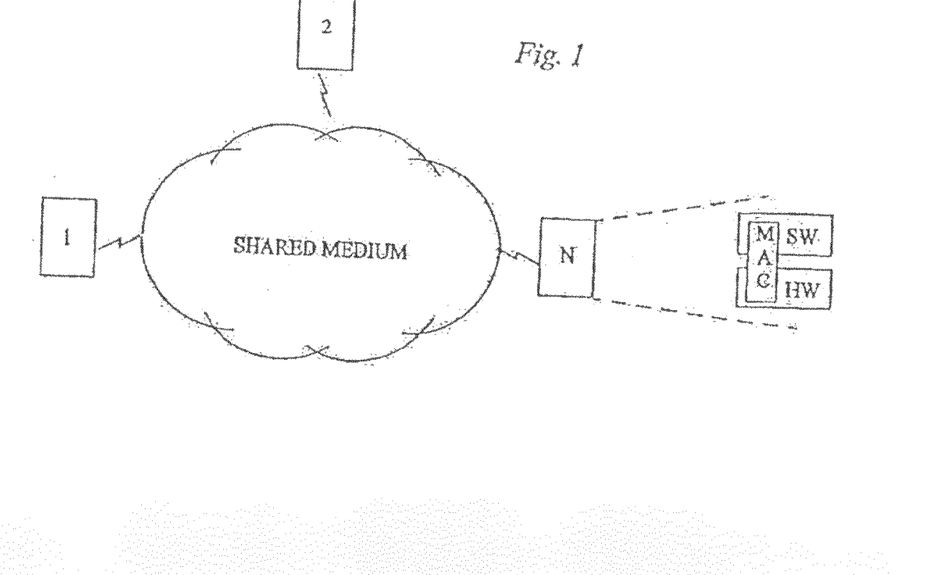
FIG. 1 is a block diagram of a system in which the present invention may be used.

Referring now to FIG. 1, a block diagram is shown of an exemplary system in which the present invention may be used. A number of devices, in this case wireless PAN devices, share a medium, in this case wireless spectrum. Further details of a device are shown. The device includes a hardware subsystem and a software subsystem. A medium access controller (MAC) controls access of the device to the shared medium. In the case of a wireless PAN device, the MAC may be of a type specified in the standard IEEE 802.15.3, for example. Typically, the MAC will be realized in a combination of hardware and software.

Figure 2:
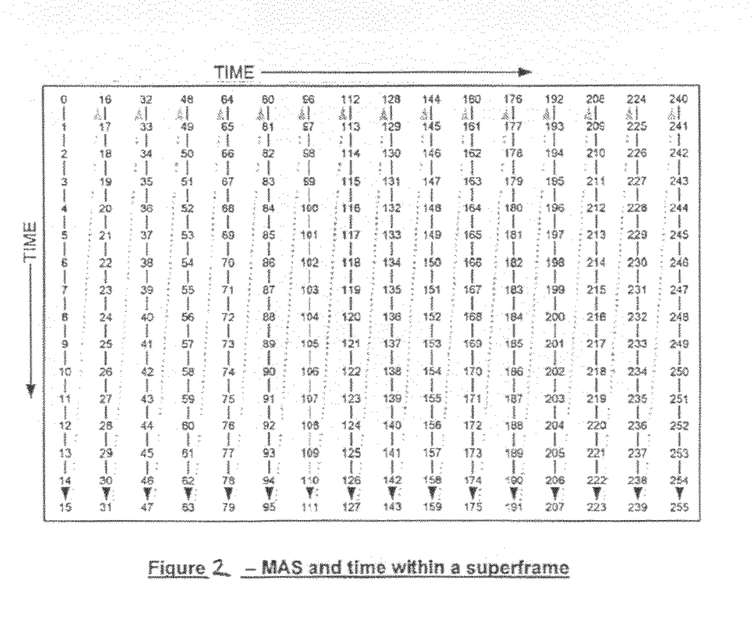
FIG. 2 is a diagram illustrating a superframe structure.
Figure 3:
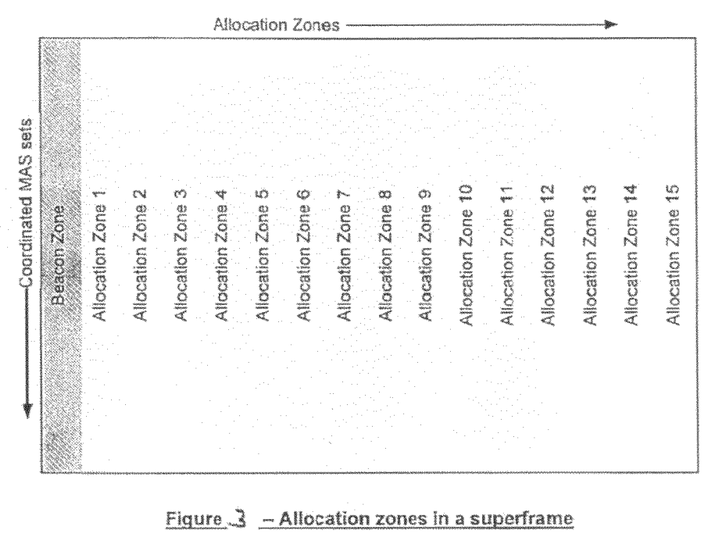
FIG. 3 is a diagram of the superframe structure of FIG. 2, illustrating allocation zones.
Figure 4:
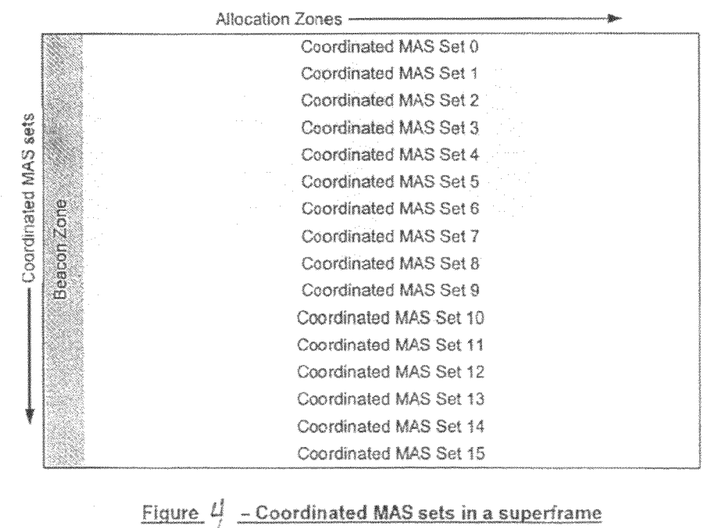
FIG. 4 is a diagram of the superframe structure of FIG. 2, illustrating coordinated MAS sets.

The shared medium may be organized in accordance with a known superframe structure illustrated in FIG. 2. The number of time slots (also referred to as Medium Access Slots, or MAS) in a superframe is 256. For conceptual and illustrative purposes, the timeslots are arranged in columns of 16 as shown in FIG. 2. Typically, a column is referred to as an allocation zone. One column, however, is set aside as a beacon zone. In the case of 256 MAS and columns of 16 MAS, there is one beacon zone (the first column) and 15 allocation zones as shown in FIG. 3. A row is referred to as a coordinated MAS set. In the present example, there are 16 coordinated MAS sets, numbered 0-15, as shown in FIG. 4.

A conventional Distributed Reservation Protocol (DRP) may be used by devices to gain access to the shared medium. In DRP, an aspiring reservation owner listens to the beacons and find unallocated MAS identified in the beacons. It then announces in its own beacon its intention to use some of the unallocated MAS, which constitutes a reservation.

All other devices are obliged to honor the reservations identified in the beacons. [A DEVICE OBTAINS A BEACON by receiving beacon frames during each beacon period.]

Figure 5:
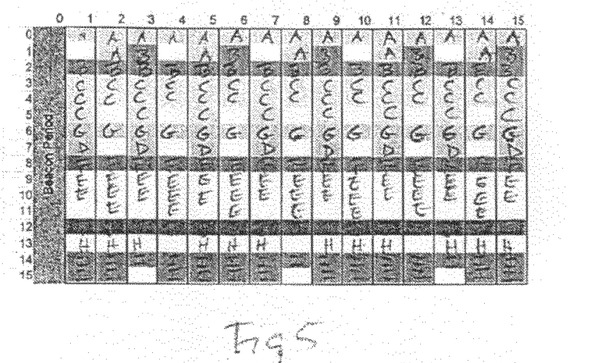
FIG. 5 is a diagram illustrating conventional allocation within the superframe.

Conventional methods of allocation suffer the problem that unallocated MAS are often scattered. An example of such an allocation is shown in FIG. 5. Allocation and use of scattered MAS is burdensome and inefficient and is likely to adversely impact device operation.

A more efficient allocation may be achieved by performing allocation in accordance with one, more preferably both, of the following rules:

1. A MAS allocation in each allocation zone shall be made so as to leave the contiguous unallocated MAS in the zone as large as possible, by taking advantage of the requirements of different application types, which afford some flexibility in the location of each MAS allocation.

2. A set of regular MAS (i.e., a multiple of 15) shall be allocated in one end of the allocation map and an irregular MAS allocation (i.e., all others) in the other end (as shown below), which minimizes the chance of unallocated MAS being trapped by allocated MAS.

Figure 6:
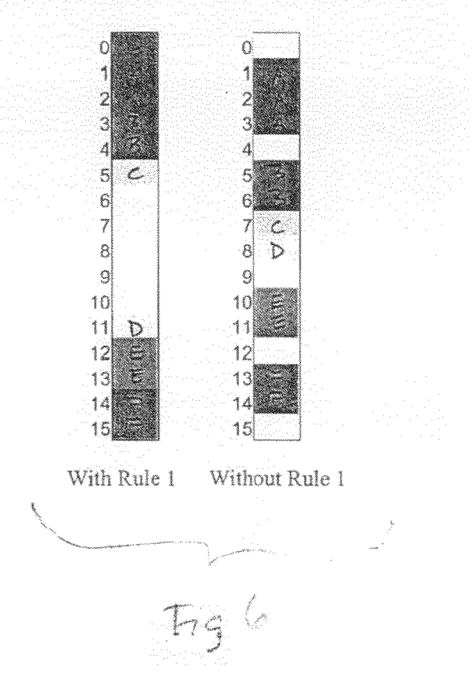
FIG. 6 is a diagram illustrating allocation within the superframe in accordance with one aspect of the present invention.

Application of the first rule is illustrated in FIG. 6. Without application of the rule, unallocated MAS within an allocation zone become scattered. With application of the rule, unallocated MAS within an allocation zone are contiguous.

Figure 7:
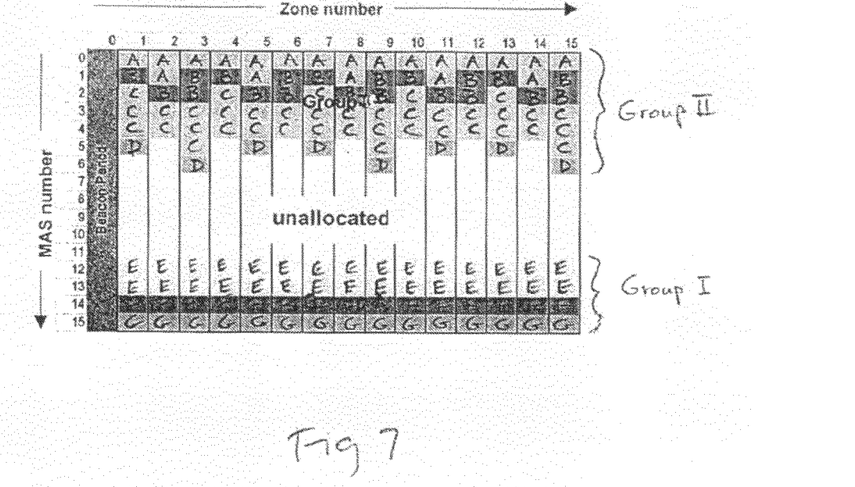
FIG. 7 is a diagram illustrating allocation within the superframe in accordance with one aspect of the present invention.

Application of the second rule is illustrated in FIG. 7. Allocations are divided into two different groups, Group I and Group II. Group I includes allocations of one or more complete coordinated MAS sets. In the illustrated example, Group I allocations are made from the bottom of the superframe upward. Group II includes all other allocations. In the illustrated example, Group II allocations are made from the top of the superframe downward. Unallocated MAS are located in the middle region of the superframe.

Figure 8:
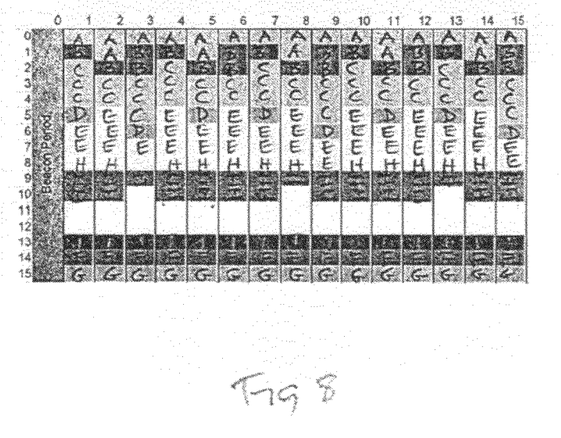
FIG. 8 is a diagram illustrating an allocation example in accordance with the present invention.

Applied together to the example of FIG. 5, the foregoing rules result in the allocation of FIG. 8. Comparing the two allocations, the same number of MAS are allocated to each device. However, in FIG. 8, unallocated MAS are contiguous in each zone. This arrangement maximizes the efficiency of contention-based channel access.

Figure 9:
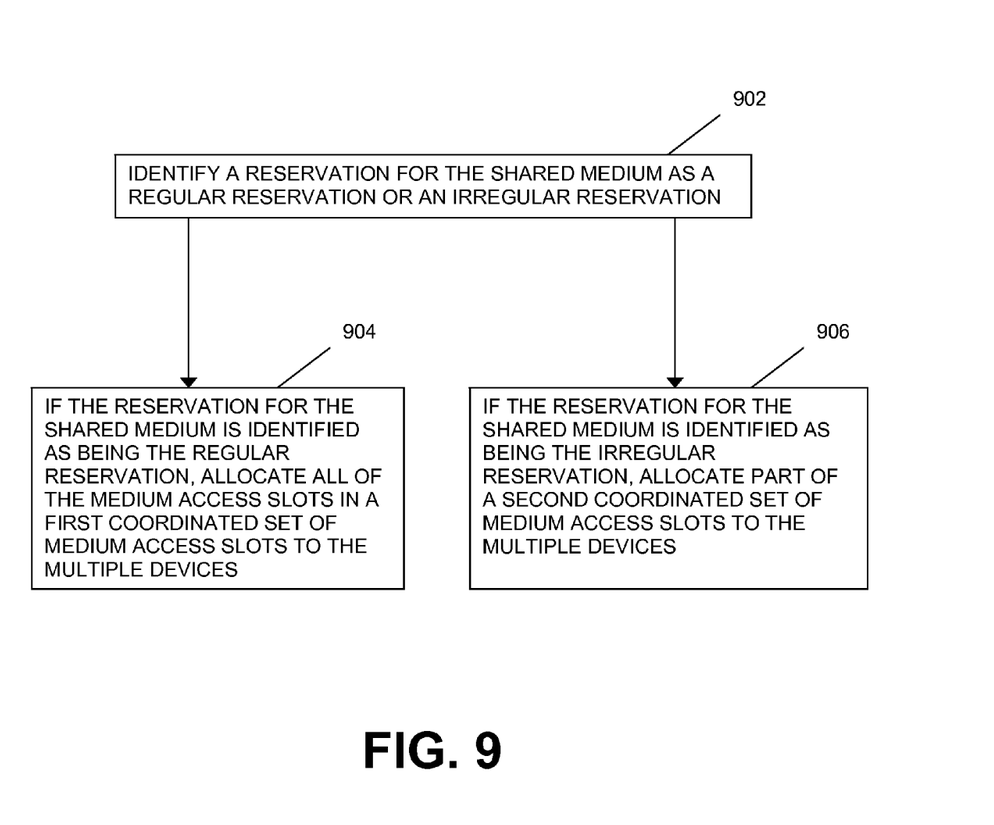
FIG. 9 is a process flow diagram of a method of sharing bandwidth of a shared medium between multiple devices in accordance with an embodiment of the invention.

FIG. 9 is a process flow diagram of a method of sharing bandwidth of a shared medium between multiple devices in accordance with an embodiment of the invention. The shared medium is structured in accordance with a frame or superframe structure. Each frame or superframe has medium access slots of specified time duration defined therein, columns of contiguous medium access slots define different allocations zones, and rows of medium access slots define coordinated sets of medium access slots. The medium access slots of a coordinated set belong to different allocation zones and are equally spaced in time. At block 902, a reservation for the shared medium is identified as a regular reservation or an irregular reservation. At block 904, if the reservation for the shared medium is identified as being the regular reservation, all of the medium access slots in a first coordinated set of medium access slots are allocated to the multiple devices. At block 906, if the reservation for the shared medium is identified as being the irregular reservation, part of a second coordinated set of medium access slots is allocated to the multiple devices. Allocation of the first coordinated set of medium access slots is made from one end of the frame or superframe structure and allocation of the second coordinated set of medium access slots is made from the other end of the frame or superframe structure such that the first coordinated set of medium access slots and the second coordinated set of medium access slots are as widely separated as possible within the columns and the rows of the frame or superframe structure.

Figure 10:
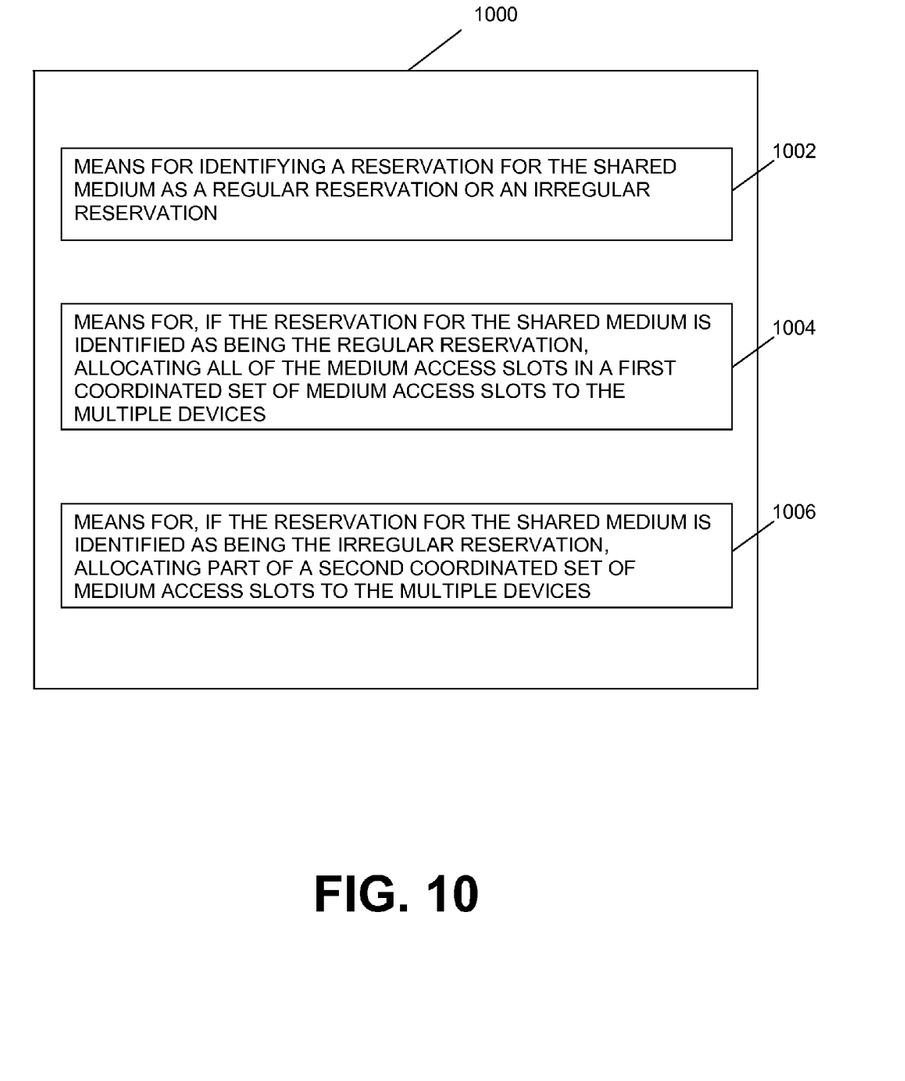
FIG. 10 is a schematic block diagram of a device for sharing bandwidth of a shared medium between multiple devices in accordance with an embodiment of the invention.

FIG. 10 is a schematic block diagram of a device 1000 for sharing bandwidth of a shared medium between multiple devices in accordance with an embodiment of the invention. The shared medium is structured in accordance with a frame or superframe structure. Each frame or superframe has medium access slots of specified time duration defined therein, columns of contiguous medium access slots define different allocations zones, and rows of medium access slots define coordinated sets of medium access slots. The medium access slots of a coordinated set belong to different allocation zones and are equally spaced in time. In the embodiment depicted in FIG. 10, the device includes means 1002 for identifying a reservation for the shared medium as a regular reservation or an irregular reservation, means 1004 for, if the reservation for the shared medium is identified as being the regular reservation, allocating all of the medium access slots in a first coordinated set of medium access slots to the multiple devices, and means 1006 for, if the reservation for the shared medium is identified as being the irregular reservation, allocating part of a second coordinated set of medium access slots to the multiple devices. Allocation of the first coordinated set of medium access slots is made from one end of the frame or superframe structure and allocation of the second coordinated set of medium access slots is made from the other end of the frame or superframe structure such that the first coordinated set of medium access slots and the second coordinated set of medium access slots are as widely separated as possible within the columns and the rows of the frame or superframe structure.

Figure 11:
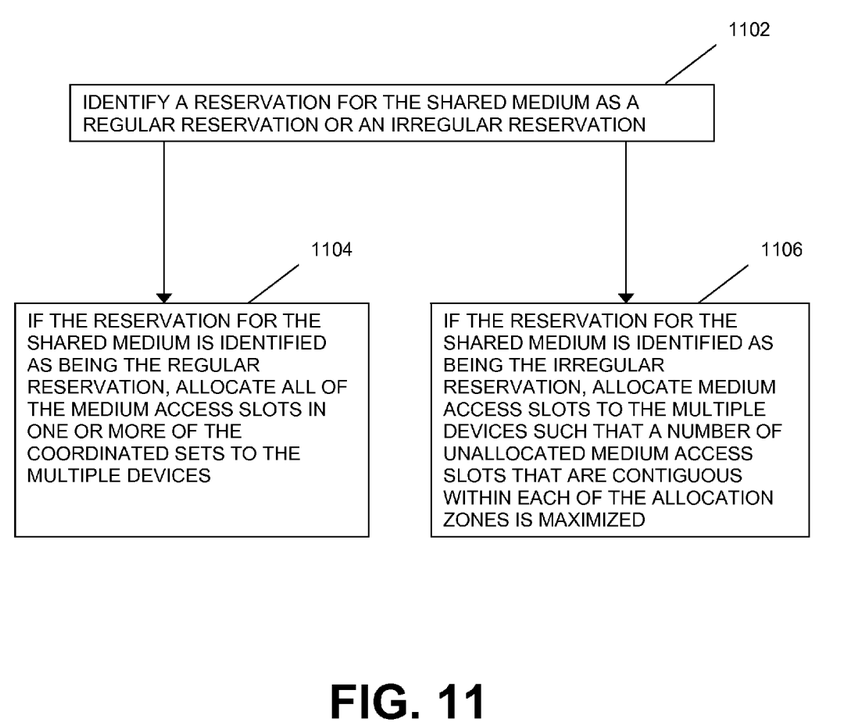
FIG. 11 is a process flow diagram of a method of sharing bandwidth of a shared medium between multiple devices in accordance with another embodiment of the invention.

FIG. 11 is a process flow diagram of a method of sharing bandwidth of a shared medium between multiple devices in accordance with another embodiment of the invention. The shared medium is structured in accordance with a frame or superframe structure. Each frame or superframe has medium access slots of specified time duration defined therein, columns of contiguous medium access slots define different allocations zones, and rows of medium access slots define coordinated sets of medium access slots. The medium access slots of a coordinated set belong to different allocation zones and are equally spaced in time. At block 1102, a reservation for the shared medium is identified as a regular reservation or an irregular reservation. At block 1104, if the reservation for the shared medium is identified as being the regular reservation, all of the medium access slots in one or more of the coordinated sets are allocated to the multiple devices. At block 1106, if the reservation for the shared medium is identified as being the irregular reservation, medium access slots are allocated to the multiple devices such that a number of unallocated medium access slots that are contiguous within each of the allocation zones is maximized.

Figure 12:
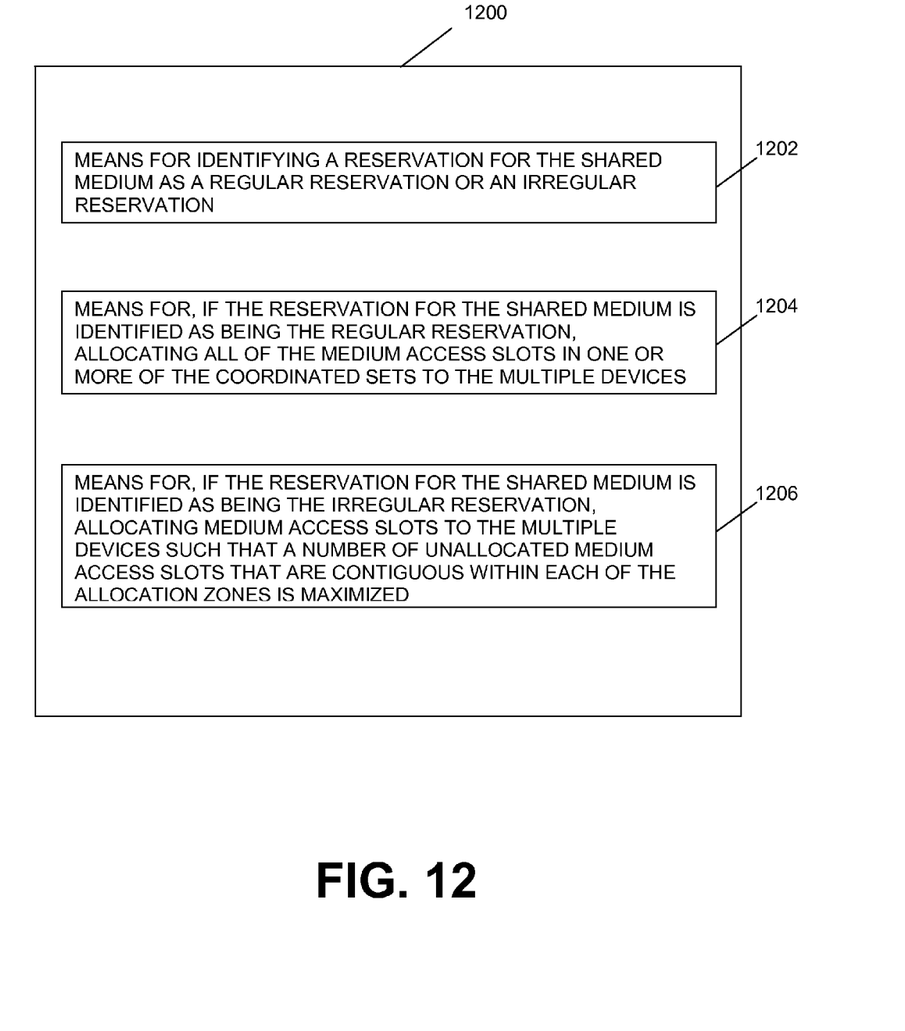
FIG. 12 is a schematic block diagram of a device for sharing bandwidth of a shared medium between multiple devices in accordance with another embodiment of the invention.

FIG. 12 is a schematic block diagram of a device 1200 for sharing bandwidth of a shared medium between multiple devices in accordance with another embodiment of the invention. The shared medium is structured in accordance with a frame or superframe structure. Each frame or superframe has medium access slots of specified time duration defined therein, columns of contiguous medium access slots define different allocations zones, and rows of medium access slots define coordinated sets of medium access slots. The medium access slots of a coordinated set belong to different allocation zones and are equally spaced in time. In the embodiment depicted in FIG. 12, the device includes means 1202 for identifying a reservation for the shared medium as a regular reservation or an irregular reservation, means 1204 for, if the reservation for the shared medium is identified as being the regular reservation, allocating all of the medium access slots in one or more of the coordinated sets to the multiple devices, and means 1206 for, if the reservation for the shared medium is identified as being the irregular reservation, allocating medium access slots to the multiple devices such that a number of unallocated medium access slots that are contiguous within each of the allocation zones is maximized.

It will be appreciated by those or ordinary skill in the art that the invention can be embodied in other specific forms without departing from the spirit or essential character thereof. The disclosed embodiments are therefore intended in all respects to be illustrative and not restrictive. The scope of the invention is indicated by the appended claims rather than the foregoing description, and all changes which fall within the meaning and range of equivalents thereof are intended to be embraced therein.

What is claimed is:

1. A method of sharing bandwidth of a shared medium between multiple devices, the shared medium being structured in accordance with a frame or superframe structure, each frame or superframe having medium access slots of specified time duration defined therein, columns of contiguous medium access slots defining different allocations zones, rows of medium access slots defining coordinated sets of medium access slots, wherein the medium access slots of a coordinated set belonging to different allocation zones are equally spaced in time, the method comprising:
   identifying a reservation for the shared medium as a regular reservation or an irregular reservation;
   if the reservation for the shared medium is identified as being the regular reservation, allocating all of the medium access slots in one or more of the coordinated sets to the multiple devices; and
   if the reservation for the shared medium is identified as being the irregular reservation, allocating medium access slots to the multiple devices such that a number of unallocated medium access slots that are contiguous within each of the allocation zones is maximized.

2. A method of sharing bandwidth of a shared medium between multiple devices, the shared medium being structured in accordance with a frame or superframe structure, each frame or superframe having medium access slots of specified time duration defined therein, groups of N contiguous medium access slots defining different allocations zones, groups of M medium access slots defining coordinated sets of medium access slots, wherein the medium access slots of a coordinated set belonging to different allocation zones are equally spaced in time, the method comprising:

identifying a reservation for the shared medium as a regular reservation or an irregular reservation; if the reservation for the shared medium is identified as being the regular reservation, allocating all of the medium access slots in a first coordinated set of medium access slots to the multiple devices; and if the reservation for the shared medium is identified as being the irregular reservation, allocating part of a second coordinated set of medium access slots to the multiple devices;

wherein allocation of the first coordinated set of medium access slots is made from one end of the frame or superframe structure and allocation of the second coordinated set of medium access slots is made from the other end of the frame or superframe structure such that the first coordinated set of medium access slots and the second coordinated set of medium access slots are as widely separated as possible within the columns and the rows of the frame or superframe structure.

3. A device for sharing bandwidth of a shared medium between multiple devices, the shared medium being structured in accordance with a frame or superframe structure, each frame or superframe having medium access slots of specified time duration defined therein, columns of contiguous medium access slots defining different allocations zones, rows of medium access slots defining coordinated sets of medium access slots, wherein the medium access slots of a coordinated set belong to different allocation zones and are equally spaced in time, the device comprising a hardware medium access controller and memory containing software, wherein the hardware medium access controller and the software operate in combination to perform steps comprising:

identifying a reservation for the shared medium as a regular reservation or an irregular reservation;

if the reservation for the shared medium is identified as being the regular reservation, allocating all of the medium access slots in one or more of the coordinated sets to the multiple devices; and if the reservation for the shared medium is identified as being the irregular reservation, allocating medium access slots to the multiple devices such that a number of unallocated medium access slots that are contiguous within each of the allocation zones is maximized.

4. A device for sharing bandwidth of a shared medium between multiple devices, the shared medium being structured in accordance with a frame or superframe structure, each frame or superframe having medium access slots of specified time duration defined therein, columns of contiguous medium access slots defining different allocations zones, rows of medium access slots defining coordinated sets of medium access slots, wherein the medium access slots of a coordinated set belong to different allocation zones and are equally spaced in time, the device comprising a hardware medium access controller and memory containing software, wherein the hardware medium access controller and the software operate to perform steps comprising:

identifying a reservation for the shared medium as a regular reservation or an irregular reservation;

if the reservation for the shared medium is identified as being the regular reservation, all of the medium access slots in a first coordinated set of medium access slots to the multiple devices; and if the reservation for the shared medium is identified as being the irregular reservation, allocating part of a second coordinated set of medium access slots to the multiple devices;

wherein allocation of the first coordinated set of medium access slots is made from one end of the frame or superframe structure and allocation of the second coordinated set of medium access slots is made from the other end of the frame or superframe structure such that the first coordinated set of medium access slots and the second coordinated set of medium access slots are as widely separated as possible within the columns and the rows of the frame or superframe structure.

* * * * *